Nov. 13, 1951 T. J. KEARNEY 2,575,278
WORK CARRIER FOR CONVEYERS
Filed Sept. 24, 1948 2 SHEETS—SHEET 1

WITNESSES
Thomas W. Kerr Jr.
A. J. Brittingham

INVENTOR:
Thomas J. Kearney,
BY Paul & Paul
ATTORNEYS.

Nov. 13, 1951 T. J. KEARNEY 2,575,278
WORK CARRIER FOR CONVEYERS
Filed Sept. 24, 1948 2 SHEETS—SHEET 2
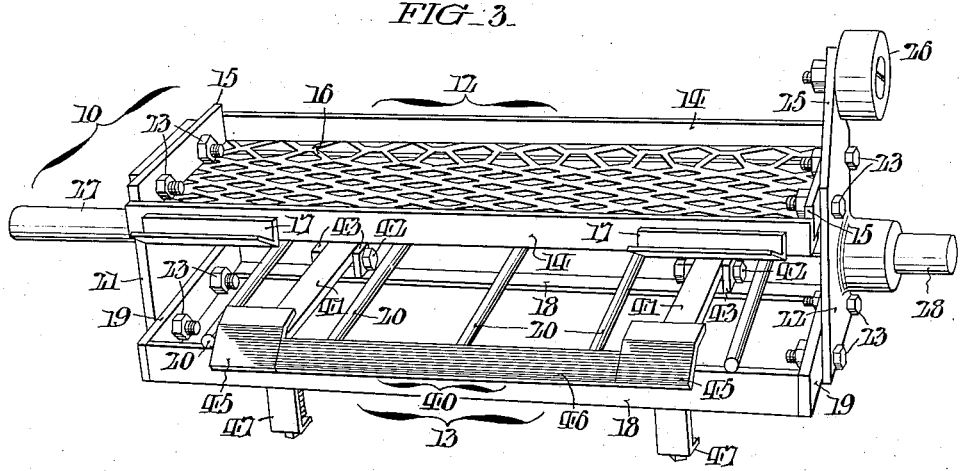
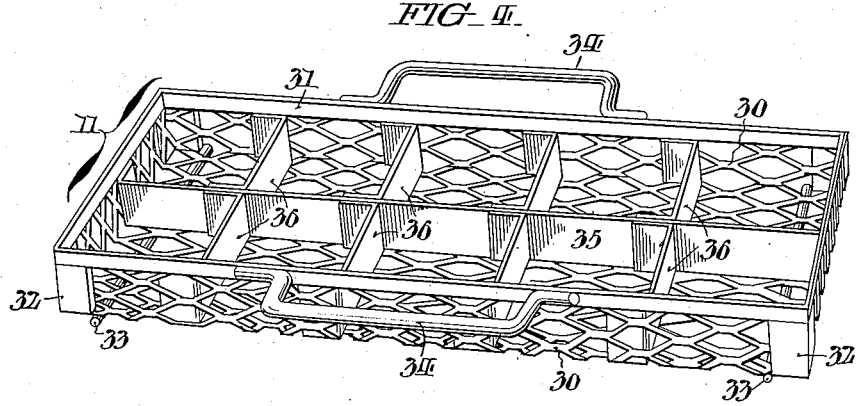
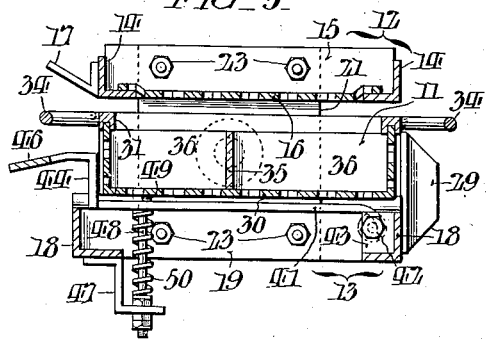
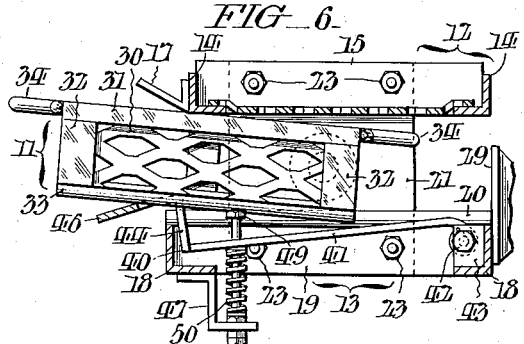
WITNESSES
Thomas W. Kerr, Jr.
A. J. Brittingham
INVENTOR:
Thomas J. Kearney,
BY Paul & Paul
ATTORNEYS.

Patented Nov. 13, 1951

2,575,278

UNITED STATES PATENT OFFICE 2,575,278

WORK CARRIER FOR CONVEYERS

Thomas J. Kearney, Detroit, Mich., assignor to Detrex Corporation, Detroit, Mich., a corporation of Michigan Application September 24, 1948, Serial No. 51,017

6 Claims. (Cl. 198—158)

This invention relates to work carriers adapted to be supported on or from belt or chain conveyors, as, for example, in apparatus of the type disclosed in a co-pending patent application Serial No. 51,016 concurrently filed by me jointly with Floyd E. McGregor, designed for cleaning or otherwise treating finished machine parts or other articles with solvents or other liquids, and in which the carriers are rotated during submergence so that the articles placed within them are more effectively subjected to the action of the liquids.

In the cleaning of various relatively small metal articles it has been recognized in the art that complete cleaning is facilitated by turning and rotating the articles to be cleaned during the time of exposure to the cleaning liquid. In the device heretofore used for cleaning roughly finished parts this has been accomplished by placing the parts in a cylindrical basket and then rotating the basket during the cleaning cycle. In the case of machined parts having smooth surfaces this method of cleaning cannot be employed since the rotating and tumbling action of loosely arranged parts of this sort damages the machined surfaces of a high proportion of the articles so handled and, while such damage is not a destructive factor in the case of roughly finished parts, it is serious enough to result in the rejection of machine finished parts.

Therefore the principal object of the present invention is to provide carrier means for holding articles to be cleaned in such a way that the carrier may be rotated without attendant marring, defacement or other damage to the surfaces of the articles contained therein.

A further object of the present invention is to provide a carrier of the kind referred to arranged for maintaining several articles of different kinds or sizes in definite separation from each other notwithstanding rotation of the carrier during the cleaning treatment.

A still further object of the present invention is to provide a carrier of the kind referred to capable of being quickly loaded and unloaded, and which lends itself to ready and economic fabrication from parts cut or otherwise fashioned from structural metal so as to be sturdy against possible deformation incident to rough handling.

Figure 1:
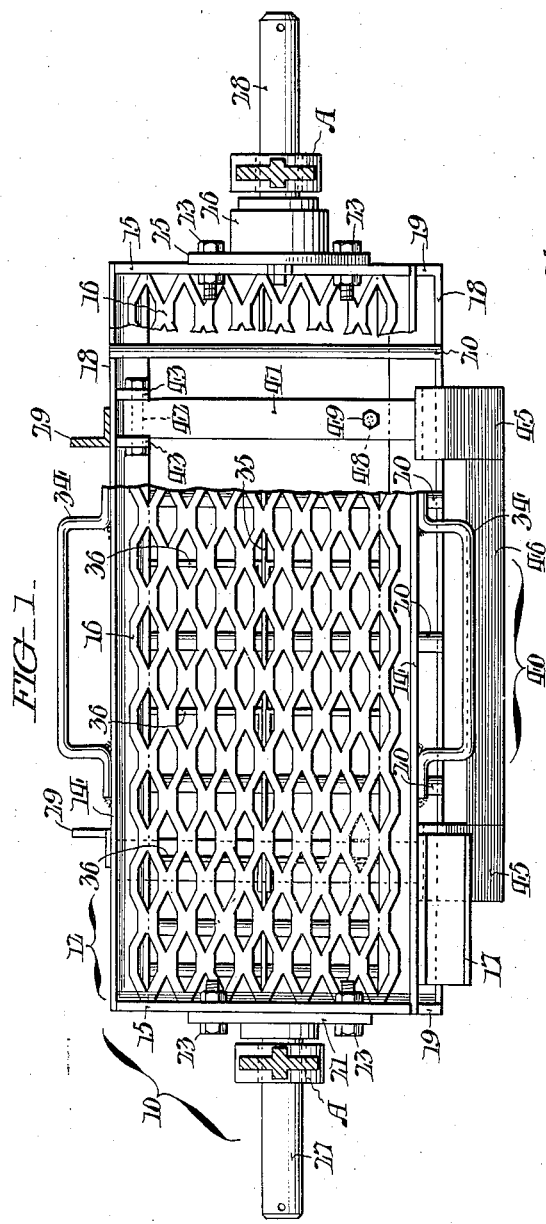

Other objects and attendant advantages will appear from the following detailed description of the attached drawings, wherein Fig. 1 shows the top plan view of a work carrier conveniently embodying my invention with a portion broken out to expose underlying parts which would otherwise be obscured.

Figure 2:
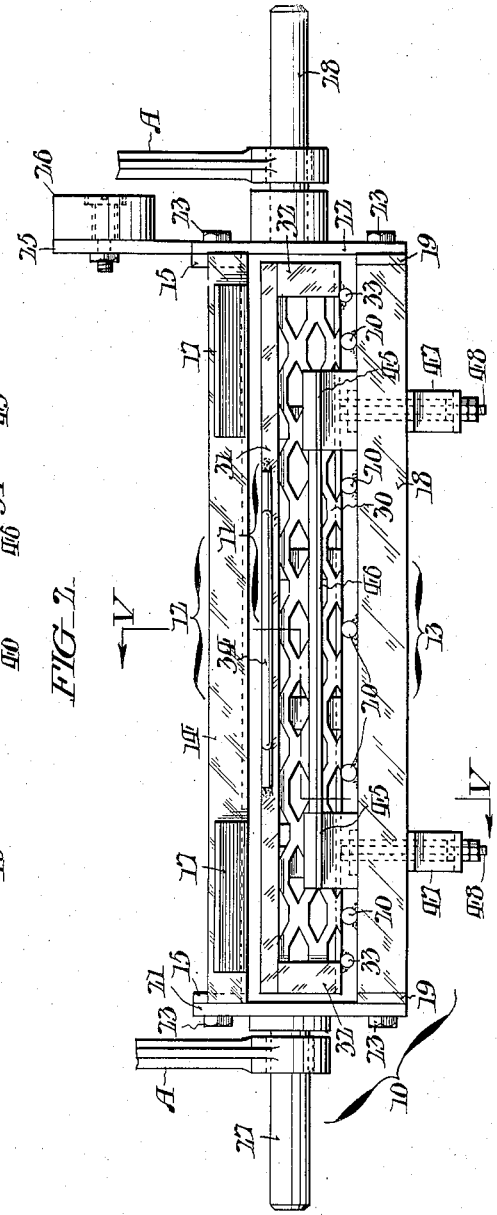

Fig. 2 shows the front elevation of the carrier.

Figs. 3 and 4 the perspective views respectively of the holder and the tray which together constitute the carrier.

Fig. 5 is a cross section view taken as indicated by the angled arrows V—V in Fig. 2; and Fig. 6 is a view similar to Fig. 5 showing how the tray is inserted into the holder.

From these illustrations it will be observed that my improved work carrier includes a holder which is comprehensively designated by the numeral 10, and a tray which is similarly designated by the numeral 11 and which fits into said holder as shown in Fig. 6. Although it may be otherwise constructed, I prefer to fashion the holder 10 from structural metal parts. As shown, the holder 10 comprises a horizontal upper component 12 with a frame of oblong configuration having right angle section longitudinals 14 and flat crosswise end bars 15 welded fast to the ends of said longitudinals, said frame being spanned by a weld secured reticulate diaphragm 16 of screen or mesh material. Affixed to the front longitudinals of the upper component of the holder adjacent opposite ends are angle lugs 17 of a V-shaped cross section which serves as guides during the insertion of the tray in a manner later on explained. The lower component 13 of the holder is spaced in parallel relation to the upper component 12 and in turn comprises a frame which corresponds in size and shape to that of said upper component, and which has right angle section longitudinals 18, but which in addition to weld attached end bars 19, has spaced round section intermediate transverse bars 20 extending between the tops of said longitudinals. The holder 10 is completed by end plates 21 and 22 whereto the components 12 and 13 are secured by screw bolts 23 with the shanks passing through the end bars of said components. Projecting outwardly from the end plates 21 and 22 are trunnions 27 and 28 whereby the holder may be pivotally supported for rotation directly on the conveyor (not shown) or in the ends of arms A, as in Fig. 2, hung from the conveyor. The end plate 22 has an upward arm extension 25 with roller 26 at the top designed for cooperation with cam means (not shown) along the path of the conveyor to turn the holder after the manner described in the co-pending application hereinbefore referred to. To the front longitudinal of the lower component 13 of the holder are fixed upwardly projecting stops 29 which determine the position of the tray within the holder.

The tray 11 is likewise constructed from structural metal, its longitudinal and end walls and bottom being integrally fashioned from a single piece of screen or mesh material 30, which latter is reinforced perimetrically by an edging band 31 and at the corners by angle pieces 32, these parts being united along the regious of mutual abutment by welding. Round section cross bars 33 are secured in the like manner to the bottom of the tray 11 adjacent its opposite ends. For convenience of ready manipulation, the tray 11 is moreover provided, at the front and rear, with grasp handles 34 which are welded fast to the edging band 31, and also with lengthwise and crosswise fixed partitions 35 and 36 whereby it is subdivided into plural compartments for reception of as many individual articles which may differ in kind or size.

In order to prevent displacement of the tray 11 within the holder 10 as the latter is turned on the trunnions, I have provided a retaining latch member 40 in the form of a yoke with side arms 41 pivotally connected by bolts 42 to lugs 43 on the front longitudinal of the lower component of the holder. The rear ends of the arms 41 are first bent upward as at 44 to form upright shoulders for engaging behind the rear edge of the tray after it has been inserted, and then outward and downward on a slope as at 45 for camming action with said tray during its insertion. The yoke is completed by a tie bar 46 which connects and is flush with the outer end portions 45 of the arms 41. Anchored in bracket lugs 47 pendent from the rear longitudinals 18 of lower component 13 of the holder 10, are upstanding bolts 48 which pass through clearance apertures in the arms 41 of the retaining element 40, and which have heads 49 at their tops to limit the upward movement of said element. Springs surrounding the bolts 48 and in compression between the arms 41 and the lugs 47 tend to yieldingly maintain the retaining element 40 normally in the horizontal position in which it is shown in Fig. 5.

To insert the tray 11, it is brought up, either of its long sides forward, and thrust into the interval between the upper and lower components 12 and 13 of the holder 10 as in Fig. 6. Incident to this operation the angle lugs 17 at the rear of the upper component 12 of the holder and the sloped ends 45 of the arms 41 of the retaining element 40 serve by camming action with the tray to guide it and thereby facilitate its insertion as will be readily understood from Fig. 6. Furthermore, by the camming action of the arm ends 45 of the retaining element 40 with the tray 11, said element will be depressed while the tray is being inserted. However, when the tray is thrust home in the holder against the stops 29, the retaining element 40 will be suddenly lifted by the springs 50 and the shoulders 44 on its arms engage behind the tray as in Fig. 5. As a consequence, the tray will be positively held against displacement in the holder 10 as the latter is turned on its trunnions 27 and 28. Attention is directed to the fact that when the tray 11 is in position as in Fig. 5, the upper component 12 of the holder serves as a cover to prevent articles placed in the tray from falling out or from shifting from one of its compartments to another as the holder is turned. To subsequently remove the tray, the retaining element 40 is depressed by pressure of a finger upon its tie bar 46 until the front edge of the tray is cleared likewise in a manner which will be readily understood from Fig. 6.

Having thus described my invention, I claim:

1. A work carrier for belt or chain conveyors including a holder with spaced parallel horizontally-arranged upper and lower components, connecting end members rigidly connecting the components in spaced relation, and pivot trunnions extending outward respectively from said end members, a tray with an article-supporting bottom insertable edgewise into the interval between the upper and lower components of the holder; stop means on the holder at the front to determine the position of the tray in the holder; and releasable means connected to the bottom component automatically operative as the tray is thrust home into the holder to engage behind the rear edge of the tray and thereby prevent its displacement during rotation of said holder on its trunnions.

2. A work carrier according to claim 1, wherein the tray is subdivided by partitions into multiple compartments as and for the purpose described.

3. A work carrier according to claim 1, wherein the upper component of the holder is reticulate, and the lower component is in the form of an open frame with spaced cross bars whereon the tray is directly supported; and wherein the walls and the bottom of the tray are also reticulate.

4. A work carrier according to claim 1, wherein the tray retaining means comprises a downwardly-yielding latch member which is pivotally connected to the front end of the lower component of the holder and normally occupies a horizontal position therein, and which has an upward shoulder at its rear end for engaging behind the tray upon insertion of the latter into the holder.

5. A work carrier according to claim 1, wherein the tray retaining means comprises a downwardly-yielding latch element which is pivotally connected to the front end of the lower component of the holder and normally occupies a horizontal position therein, said element having an upward shoulder at its rear end for engaging behind the tray upon insertion of the latter into the holder, and a forwardly and downwardly sloping projection at the top of said shoulder for camming action with the tray during its insertion.

6. A work carrier according to claim 1, wherein the tray retaining means comprises a downwardly-yielding latch element which is pivotally connected to the front end of the lower component of the holder and normally occupies a horizontal position therein, said element having an upward shoulder at its rear end for engaging behind the tray upon insertion of the latter into the holder, and a forwardly and downwardly sloping projection at the top of said shoulder for camming action with the tray during its insertion; and wherein the upper component of the holder is provided at its front edge with a projection which is sloped counter to the camming projection on the retaining element to cooperate with the latter in guiding the tray into the holder.

THOMAS J. KEARNEY.

REFERENCES CITED

The following references are of record in the file of this patent:

UNITED STATES PATENTS

| Number | Name | Date |
|--------|------|------|
| 498,299 | Petway et al. | May 30, 1893 |
| 1,257,902 | McCullough | Feb. 26, 1918 |
| 1,400,894 | Mason | Dec. 20, 1921 |
| 1,499,718 | Zykin | July 1, 1924 |
| 1,804,099 | Hazy | May 5, 1931 |
| 2,243,625 | Gettleman | May 27, 1941 |
| 2,358,507 | Haberstump | Sept. 19, 1944 |
| 2,367,652 | Trier et al. | Jan. 16, 1945 |